July 17, 1951  A. N. GOLDSMITH  2,561,197
TELEVISION INSPECTION SYSTEM
Filed Dec. 30, 1948
Fig. 1.
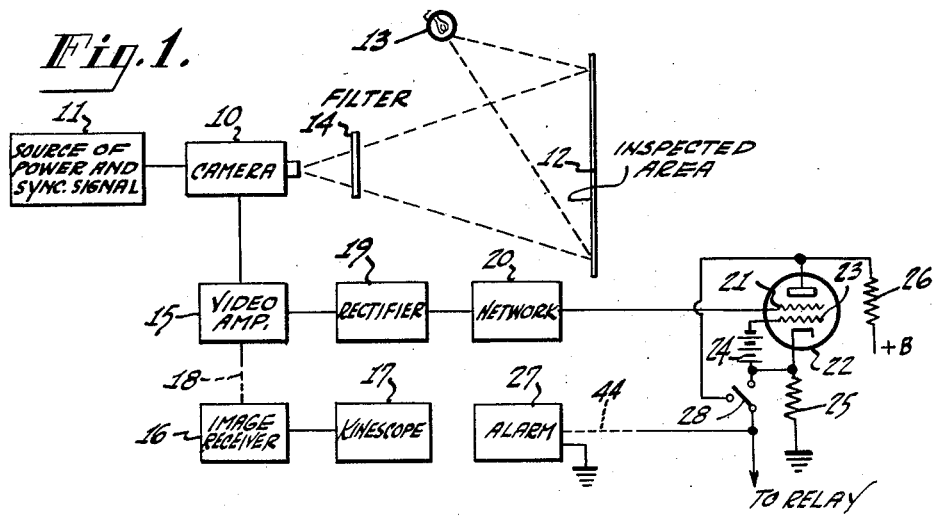
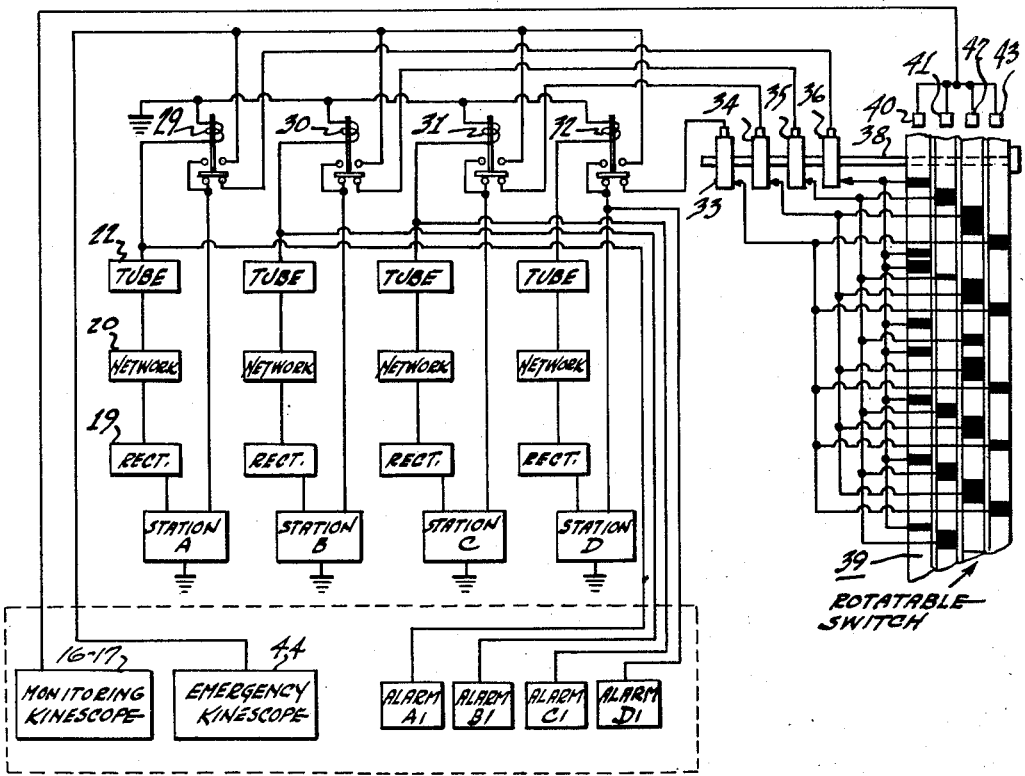
Fig. 2.
INVENTOR
ALFRED N. GOLDSMITH
BY
ATTORNEY Patented July 17, 1951

2,561,197

UNITED STATES PATENT OFFICE 2,561,197

TELEVISION INSPECTION SYSTEM

Alfred N. Goldsmith, New York, N. Y.

Application December 30, 1948, Serial No. 68,118

4 Claims. (Cl. 178—6.8)

This invention relates to inspection systems which are adapted (1) to produce an image of an inspected area at an inspection point which is more or less remote from such area, (2) to produce a potential which is dependent on an abnormality, deviation, or change in the energy radiated from the inspected area, and (3) to utilize such potential to energize an indicator or an alarm by which the attention is called to the image of the inspected area.

More particularly, the present invention has to do with a plurality of such units which have their various functions so correlated that there is provided at a common inspection point, which is more or less remote from the inspected areas, information by which the condition at each of the inspected surfaces may be determined.

To this end, switching means are provided for selecting the normal video output currents of the different inspection units to produce at the inspection point images of the inspected areas which are made to appear at different times and to be maintained for selected time intervals. Additionally, there is provided means whereby an abnormality in the energy radiated from any one of the inspected area functions to provide at the inspection point an image of this one area which is maintained so long as its radiated energy continues to be abnormal.

As set forth in my concurrently filed applications, Serial Numbers 68,115, 68,116, 68,117, filed concurrently herewith for "Inspection Systems," the energy radiated from the inspected surfaces may be of various selected wave lengths, and the abnormalities likely to occur in such radiated energy may be produced by different factors. Thus, the radiated energy may be in the form of visible light, ultra-violet light, red light, or energy in the infrared range. The factor likely to produce an abnormality in the radiated energy of the inspected area may be a change in the brightness of a material moved through the inspected area, or a change in the velocity, temperature, dimensions or any other characteristic of the inspected object which is capable of producing change in the energy radiated from it. It is contemplated that the inspection units of the present invention may be adapted to respond to abnormalities in radiation produced either by the same or by different causes.

The invention has for its principal purpose the provision of an improved inspection system and method of operation whereby images of a plurality of inspected areas are produced at a common inspection point at different times and for selected time intervals. A further purpose of the invention is the provision of means whereby an abnormality in the energy radiated from any one of the inspected areas is utilized to produce at the inspection point an image of such one area which image is maintained so long as the abnormality persists.

The invention will be better understood from the following description considered in connection with the accompanying drawings and its scope is indicated by the appended claims.

Referring to the drawings:

Fig. 1 is for the most part a block diagram illustrating one possible form of the inspection units which go to make up the system of Fig. 2, and Fig. 2 illustrates the relation between the different units of the system.

The inspection unit of Fig. 1 includes a television camera 10 which is energized from a source 11 and has in its field of view an inspected area 12. A light source 13 may be provided for illuminating the inspected area 12 in cases where the inspected object itself is not the primary source of radiation. Energy radiated from the surface 12 is passed to the camera 10 either directly or through a radiation-selective filter 14 when such selection is desired.

The video current output of the camera 10 is amplified by an amplifier 15. The current so amplified is utilized for two different purposes. One part of it is passed to an image receiver 16 and thence to a kinescope 17 which is located at an inspection point more or less remote from the inspected area as indicated by the broken line 18.

Another part of the amplified current is passed through a rectifier 19 to a network 20 which may be of various types depending on the characteristics of the abnormality to be detected. For example, it may be a filter where a particular frequency or range of frequencies is involved, a differentiating circuit where rapid changes are involved, or an integrating circuit where slow changes are involved. In any case, it functions to produce a control potential which is applied to a grid 21 of a tube 22.

The tube 22 has a grid 23 which is biased by a source of potential 24 to a negative potential such that the current drawn through a cathode lead resistor 25 or an anode lead resistor 26 produces a voltage drop which is incapable of activating an alarm 27 located at the inspection point or a relay hereinafter described in connection with Fig. 2. Whether the voltage drop of the resistor 25 or that of the resistor 26 is utilized to activate the alarm and relay is determined by the closed position of a switch 28. Thus, if the output voltage of the network 20 is of negative polarity a more positive voltage is applied from the anode of the tube 22 through the switch 28 to the alarm and relay. Similarly if the network output voltage is positive, a more positive voltage is applied from the cathode of the tube 22 through the switch 28 to the alarm and relay. The alarm 27 is remote from switch 28, as indicated by the dash line 44.

As pointed out in the above copending applications, the potential derived through the switch 28 may be utilized also to energize a motor or other device by which the inspected area is moved or otherwise manipulated to correct the abnormality.

In Fig. 2 are shown station A, station B, station C, and station D, each of which includes the parts of Fig. 1 which are indicated by the reference numerals 10 to 15. The amplified video output currents of these stations are supplied respectively through the lower contacts of relays 29, 30, 31, and 32 to slip rings 33, 34, 35, and 36. Mounted on the same rotatable shaft 38 as these slip rings is a rotatable switch 39 which has four separate groups or series of conductive segments which are shown as black and are arranged to cooperate with the brushes 40, 41, 42, and 43. The slip rings 33 to 36 are each connected to a different one of these series of conductive segments, and the brushes 40 to 43 are connected to the image receiver and kinescope 16—17.

Under these conditions, rotation of the switch and slip rings produces at the kinescope 17 images of the areas under inspection, the timing of these images being determined by the location of the conductive segments, and their duration being determined by the length of these segments. Such timing and duration will in any given case depend upon the nature of the processes or phenomena under inspection and of the abnormalities or departure from predetermined conditions which it is desired to detect.

When abnormality occurs in the energy radiated from any one of the inspected areas, the corresponding relay 29, 30, 31 or 32 is operated to its upper closed position thereby diverting the corresponding video output current to an image receiver and an "emergency" kinescope 44 at which the image of that one area is maintained until the abnormality is corrected. At the same time, an alarm A1, A2, A3 or A4 is activated, as explained in connection with Fig. 1, to call attention to the image so maintained. By conventional electrical means, the alarm-actuating currents may also actuate corresponding abnormality-correcting circuits and devices.

What the invention provides is an inspection system for detecting abnormalities in the energy radiated from a plurality of areas under inspection, this system operating (1) during normal radiation from the inspected surfaces to produce at a remote inspection station images of the inspected areas which are made to appear at different times and for selected time intervals and (2) during abnormality in the radiation at any one of the inspected areas to produce at the inspection station an image of this one area which is maintained until the abnormality is corrected. Alarm and abnormality-correcting means are also provided.

I claim as my invention:

1. A system for inspecting the radiation from each of a plurality of areas for departure from normal radiation by said areas comprising, in combination, a plurality of television cameras each being presented to view a different one of said areas, each camera being adapted to produce a normal video current output in response to viewing normal radiation and to produce an abnormal video current output in response to viewing abnormal radiation, a plurality of means each of which is connected to a different one of said camera outputs to produce a control potential responsive to an abnormal video output from its associated camera, a monitoring kinescope, means selectively coupling said camera outputs to said monitoring kinescope whereby said monitoring kinescope produces images of said areas which are made to appear at different times and to be maintained for selected time intervals, an emergency kinescope, and means interposed between the output from each of said cameras and said selectively coupling means to switch the video current output of a camera from said monitoring kinescope to said emergency kinescope responsive to a control potential due to an abnormal video output from any one of said cameras applied to the associated one of said means to produce said control potential whereby an image of the area having an abnormal radiation is produced on said emergency kinescope.

2. A system for inspecting the radiation from each of a plurality of areas for departure from normal radiation by said areas comprising, in combination, a plurality of television cameras each being presented to view one of said areas, each camera being adapted to produce a normal video current output in response to viewing normal radiation and to produce an abnormal video current output in response to viewing abnormal radiation, a plurality of means each of which is connected to a different one of said camera outputs to produce a control potential responsive to an abnormal video output from said camera, a plurality of switches each having a first and second switch position and each being responsive to an application of said control potential to be actuated from its first to its second position, each of said switches being coupled to one of said control potential producing means to be switched responsive thereto, means coupling the output of each camera to the one of said switches actuated responsive to an abnormal output therefrom to be switched from said first to said second switch position when said switch is actuated, an emergency kinescope connected to all said second switch positions, a monitoring kinescope, and selective switch means to couple all said first switch positions to said monitoring kinescope and to time the duration and sequence of the images appearing on said monitoring kinescope which are the images of the areas viewed by said television cameras.

3. A system for inspecting the radiation from each of a plurality of areas for departure from normal radiation of said areas comprising, in combination, a plurality of television cameras each being presented to view one of said areas, each camera being adapted to produce a normal video current output in response to viewing normal radition and to produce an abnormal video current output in response to viewing abnormal radition, a plurality of means each of which is connected to a different one of said camera outputs to produce a control potential responsive to an abnormal video output from said camera, a plurality of switches each having a first and second switch position and each being responsive to an application of said control potential to be actuated from its first to its second position, each of said plurality of switches being coupled to one of said control potential producing means to be switched responsive thereto, means coupling the output of each camera to the one of said switches actuated responsive to an abnormal output therefrom to be switched from said first to said second switch position when said switch is actuated, an emergency kinescope connected to all said second switch positions, a rotatable switch having a plurality of groups of segments equal in number to said plurality of television cameras, means coupling each of said switch first positions to a respective group of segments of said rotatable switch, a monitoring kinescope coupled to all of said groups of segments each of said groups of segments being arranged for coupling the output of each of said television cameras to said monitoring kinescope at predetermined times and for predetermined intervals.

4. A system for inspecting the radiation from each of a plurality of areas for departures from normal radiation of said areas comprising, in combination, a plurality of television cameras each being presented to view one of said fields, each of said television cameras being adapted to produce a normal video current output in response to viewing normal radiation and to produce an abnormal video current output in response to viewing abnormal radiation, a relay for each of said cameras having a relay coil, a pair of normally closed contacts and a pair of normally open contacts, a rotatable switch having a plurality of groups of segments equal in number to said plurality of television cameras, a monitoring kinescope, the output from each of said cameras being respectively connected to one of each pair of contacts of each of said relays, each of said normally closed relay contacts being connected to one of said rotatable switch segment groups, means to connect each of said segment groups to said monitoring kinescope, each of said segment groups being arranged for coupling the output of each of said television cameras to said monitoring kinescope at predetermindd times and for predetermined intervals, an emergency kinescope connected to all said normally open contacts of said relays, a plurality of means each of which is connected to a different one of said camera outputs to produce a control potential responsive to an abnormal video output from said camera, and means connecting each of said control potential producing means to each of the coils of the respective relays connected to the respective cameras to which each of said control potential producing means is responsive whereby a one of said relays operates in response to the application of a control potential thereto to open its normally closed contacts and close its normally open contacts and an image of the area in which the abnormality causing the control potential to be generated is presented on the emergency kinescope and not on the monitoring kinescope.

ALFRED N. GOLDSMITH.

REFERENCES CITED

The following references are of record in the file of this patent:

UNITED STATES PATENTS

| Number | Name | Date |
| --- | --- | --- |
| 2,237,440 | Jones | Apr. 8, 1941 |
| 2,262,942 | Jones | Nov. 18, 1941 |
| 2,490,268 | Herbst | Dec. 6, 1949 |